J. H. MULLIN.
SPRING WHEEL.
APPLICATION FILED JULY 24, 1913.
1,132,867.
Patented Mar. 23, 1915.
2 SHEETS—SHEET 2.
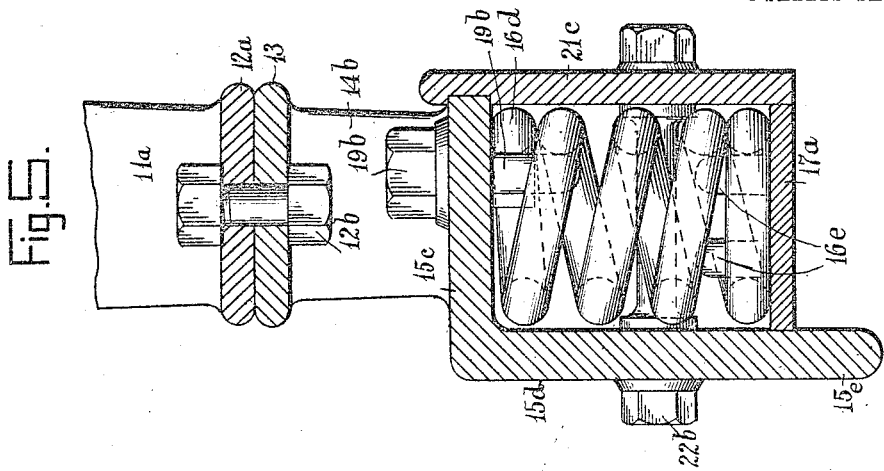
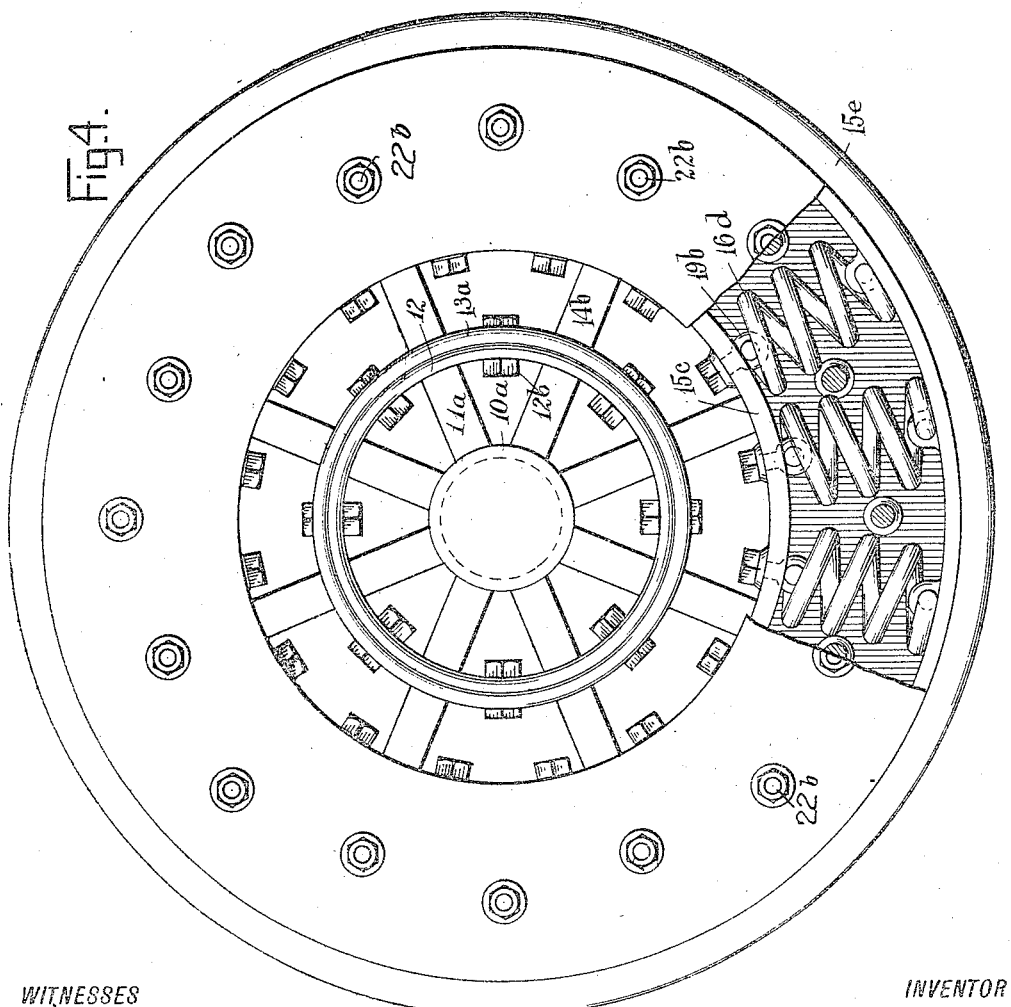
WITNESSES
INVENTOR
Joseph H. Mullin
BY
ATTORNEYS

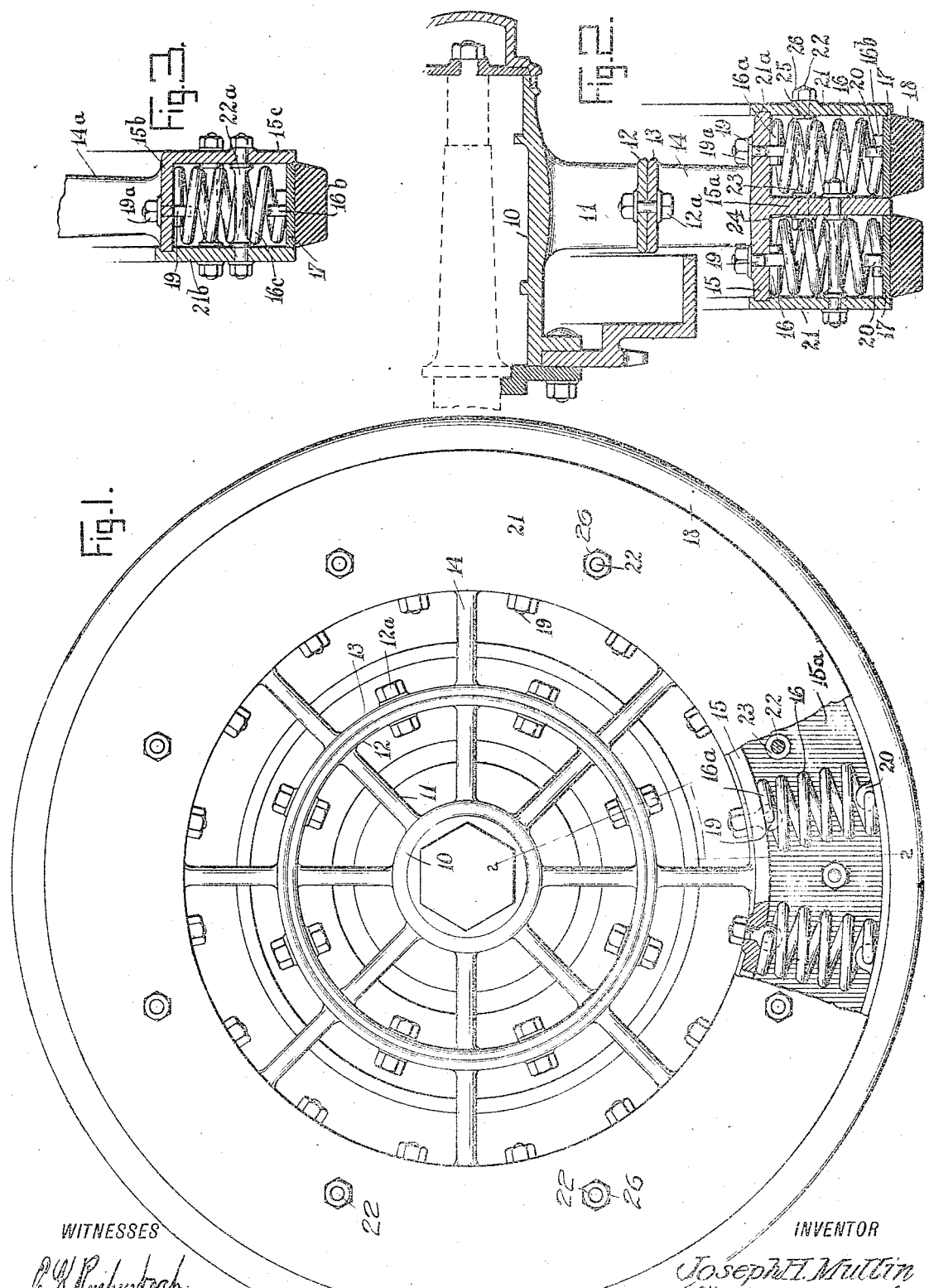

UNITED STATES PATENT OFFICE.

JOSEPH H. MULLIN, OF MIFFLINBURG, PENNSYLVANIA.

SPRING-WHEEL.

1,132,867.

Specification of Letters Patent.

Patented Mar. 23, 1915.

Application filed July 24, 1913. Serial No. 780,932.

*To all whom it may concern:*

Be it known that I, JOSEPH H. MULLIN, a citizen of the United States, and a resident of Mifflinburg, in the county of Union and State of Pennsylvania, have invented a new and Improved Spring-Wheel, of which the following is a full, clear, and exact description.

My invention relates to spring wheels and may be advantageously embodied in automobile wheels, or car wheels, or in the pulleys of shafting, and it is to be understood that the term spring wheel as used herein, includes pulleys.

It is a design of my invention to provide a spring wheel having spring elements so arranged as to give the maximum cushioning effect, and composed of comparatively few parts.

It is a further design of the invention to provide a wheel that may be conveniently assembled, and in which the springs will be effectively housed against the entrance of dirt and water.

The invention will be particularly explained in the specific description following.

Reference is to be had to the accompanying drawings forming a part of this specification, in which similar characters of reference indicate corresponding parts in all the views.

Figure 1 is a face view of an automobile wheel embodying my invention, parts being in section; Fig. 2 is a transverse section on the line 2—2 of Fig. 1; Fig. 3 is a detail transverse section illustrating a slightly different form from that shown in Figs. 1 and 2; Fig. 4 is a view similar to Fig. 1, but showing the invention embodied in a car wheel; and Fig. 5 is a detail cross sectional view of the form shown in Fig. 4.

In constructing a wheel in accordance with my invention a hub section is provided, comprising the hub 10, spokes 11 and a rim 12. An outer section is provided which comprises an inner base rim 13, spokes 14, and an outer rim 15, the outer rim having means to support a tire and springs, as well as housing elements for the springs, and fastening devices for the housing elements and springs, as hereinafter explained.

The rim 12 is concentric with the hub 10 and presents a broad outer side parallel with the hub, and the inner base rim 13 of the outer section is similarily disposed to fit snugly over the rim 12, and the two are secured by short radial bolts 12$^a$ alternating with the spokes 11. The spokes 14 are disposed preferably in radial alinement with the spokes 11 of the hub section. The outer rim 15 forms a seat for a series of radially disposed spiral compression springs 16, there being in the form shown in Fig. 2, two annular series of such springs, while in Fig. 3, a single series is shown.

Extending around the outer ends of each annular series of compression springs 16 and sustained thereby, is a rigid metallic tire 17, on which a suitable rubber tread 18 is secured in the case of an automobile wheel. The inner end of each spring is secured by an eye-bolt 19 and a nut 19$^a$, the eye of the bolt facing laterally and receiving the inner terminal 16$^a$ of the spring. The outer terminal 16$^b$ of the spring is received in the eye of a lug 20, said lugs extending inwardly from the inner surface of the metallic tire 17.

The outer rim 15 has cast thereon or firmly secured thereto, a radial rib 15$^a$ that extends annularly around the wheel, and said rib with side plates 21 incloses the spring at the sides, said plates 21 being disposed radially and extending annularly around the wheel. The plates 21 are securely clamped in position by transverse bolts 22.

The arrangement of the parts is such as to facilitate assembling the same, as follows: The several springs 16 are first secured by their outer ends to the lugs 20 of the metallic tire 17 by forcing the ends of the springs through the said lugs, the work being carried out on a suitably equipped table. When all the springs are placed on a tire the latter is picked up and placed in position against the radial rib or partition 15$^a$ (Fig. 2) or against an equivalent member (Fig. 3) as hereinafter explained. The inner ends of the springs will then be positioned adjacent to the eyes of the bolts 19 and may readily be pressed through the eyes so that upon tightening the nuts 19$^a$, the springs will be firmly secured, disposed radially around the wheel, with the yieldingly sustained tire 17 extending annularly outside of the springs. The bolts 22 are now secured to the partition or radial rib 15$^a$. It will be seen that the said bolts have adjacent to the inner ends, shoulders 23 to come to a bearing against one face of the said radial rib when the inner end of the bolt is passed through said rib. A nut 24 is then applied to the inner end of the bolt and tightened up. There are in practice, preferably sixteen springs disposed around the wheel, and similarly sixteen bolts 22 alternating with the springs. When all the bolts have been secured as described to the radial rib 15ª, an outer side plate or ring 21 is placed in position to complete the housing of the springs. Said plates are formed with bolt-holes through which the outer ends of the bolts 22 pass, the bolts having shoulders 25 near the outer ends to bear against the inner sides of the plates 21, and being adapted to receive nuts 26 outside of the said plates, to firmly clamp the latter in position on the bolts. The plates 21 are further formed at the inner faces thereof with annular grooves 21ª, to receive the side edges of the outer rim 15 to effect an interlock with the said rim. The complete outer section, with the springs secured and housed, and with the tire in position, is then placed around the hub section 11, the inner rim 13 of the outer section being snugly received over the outer rim 12 of the hub section. The wheel is completed by fastening the rims 12 and 13 by the bolts 12ª. It will thus be seen that the assembling of the parts may be accomplished with convenience, despatch and precision. The rigid, non-deformable rim 13 supports the assembled cushion elements, and the whole may thus be quickly secured to the rim 12 of the hub section.

The hub section, it should be mentioned, is cast in one piece, the hub 10, spokes 11 and outer rim 12 being integral. Similarly the inner rim 13, spokes 14, outer rim 15 and radial rib 15ª, are cast in one piece, this construction promoting economy and providing the rigid radial member 15ª for receiving the transverse bolts.

In Fig. 3, instead of having two annular series of springs separated by the integral rib 15ª, the spokes 14ª of the outer section have an outer rim 15ᵇ formed at one side with a radial rib 15ᶜ corresponding with the rib 15ª, and like the latter forming one side of the housing for the series of springs 16ᶜ. The springs 16ᶜ are secured to the tire 17 having the described lugs 16ᵇ securing one end of each spring, the opposite ends of the springs being secured by the described bolts 19 and nuts 19ª. Bolts 22ª, the same in all respects as the bolts 22, secure the housing ring 21ᵇ. The single annular series of springs it will thus be seen, are disposed in radial alinement with the spokes 14ª.

The car wheel shown in Figs. 4 and 5 has a hub 10ª, spokes 11ª, and an outer rim 12ª essentially corresponding with the similar parts in the automobile wheel, and bolts 12ᵇ clamp said outer rim and the inner rim 13ª of the inner section. On the spokes 14ᵇ of the outer section is cast an outer rim 15ᶜ having the radial rib 15ᵈ at one side thereof. In this construction the compression springs 16ᵈ are secured at the inner ends by eye-bolts 19ᵇ, and the outer end of each spring I prefer to secure by two lugs 16ᵉ similar to the lugs 16ᵇ, and formed upon the tire or tread 17ª. Transverse bolts 22ᵇ clamp the annular housing plate or ring 21ᶜ in position, the bolts and the said pate being formed similarly to the corresponding parts in the automobile wheel. In the car wheel the tire or tread 17ª is within the outer edge of the fixed radial rib 15ᵈ, the latter projecting sufficiently beyond the tread of the wheel to constitute the wheel flange 15ᵉ.

Having thus described my invention, I claim as new, and desire to secure by Letters Patent:

A spring wheel comprising a hub section having a rigid rim, an outer section having inner and outer rims in fixed relation to each other, said inner and outer rims being each unitary and of a width to extend transversely across the wheel from one side thereof to the other, radial bolts rigidly securing the inner rigid rim of the outer section to the rigid rim of the hub section, a tire, springs between the tire and the outer rim of the outer section, and radial bolts securing the inner ends of the said springs to the said outer rim of the outer section, the said inner and outer rims of the outer section being spaced to accommodate the bolt heads and afford clearance for the manipulation of the bolts.

In testimony whereof I have signed my name to this specification in the presence of two subscribing witnesses.

JOSEPH H. MULLIN.

Witnesses:
CHAS. H. GUTELIUS,
R. S. GUTELIUS.